United States Patent
Katsura et al.

(10) Patent No.: US 8,882,187 B2
(45) Date of Patent: Nov. 11, 2014

(54) VEHICLE SUN ROOF APPARATUS

(71) Applicant: Aisin Seiki Kabushiki Kaisha, Kariya (JP)

(72) Inventors: Shintaro Katsura, Kariya (JP); Tetsuya Hirata, Jiangsu (CN); Shintaro Suzuki, Kasugai (JP); Kiyozumi Fukami, Chiryu (JP); Kohji Matsuoka, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/776,979

(22) Filed: Feb. 26, 2013

(65) Prior Publication Data

US 2013/0264845 A1    Oct. 10, 2013

(30) Foreign Application Priority Data

Mar. 9, 2012   (JP) ................ 2012-053300

(51) Int. Cl.
| B60J 7/19  | (2006.01) |
| B60J 7/047 | (2006.01) |
| B60J 7/043 | (2006.01) |
| B60J 7/02  | (2006.01) |

(52) U.S. Cl.
CPC ............ B60J 7/043 (2013.01); B60J 7/0435 (2013.01); B60J 7/024 (2013.01)
USPC .................. 296/216.03; 296/216.05; 296/224

(58) Field of Classification Search
USPC ......................... 296/216.02–216.05, 221, 224
See application file for complete search history.

(56) References Cited

U.S. PATENT DOCUMENTS

| 4,877,285 | A  | * | 10/1989 | Huyer .................... 296/216.03 |
| 5,154,482 | A  |   | 10/1992 | Hayashi et al. |
| 7,828,375 | B2 |   | 11/2010 | Honjo et al. |
| 2008/0303316 | A1 | | 12/2008 | Mooney et al. |
| 2012/0001458 | A1 | | 1/2012 | Sawada |

FOREIGN PATENT DOCUMENTS

| FR | 2 644 113 | 9/1990 |
| JP | 2000-108676 | 4/2000 |
| JP | 2006-62395 | 3/2006 |
| JP | 4109583 | 4/2008 |
| WO | WO 2008/049409 | 5/2008 |

OTHER PUBLICATIONS

Extended Search Report for EP Appl. No. 13158194.4 dated Jul. 15, 2013.

(Continued)

*Primary Examiner* — Dennis H Pedder
(74) *Attorney, Agent, or Firm* — Finnegan, Henderson, Farabow, Garrett & Dunner, LLP

(57) ABSTRACT

Provided is a vehicle sun roof apparatus comprising: a movable panel configured to open and close an opening section, a guide rail provided at an edge portion of the opening section in the vehicle width direction, a sliding member linked to an edge portion of the movable panel in the vehicle width direction and provided along the guide rail so as to be movable in the fore-and-aft direction of the vehicle, a check mechanism configured to release a movement lock of the movable panel by locking the movement of the movable panel, and an engagement and disengagement switching mechanism provided with a first member supported by either the sliding member or the edge portion of the movable panel in the vehicle width direction.

4 Claims, 8 Drawing Sheets

(56) References Cited

OTHER PUBLICATIONS

S. Katsura, "Vehicle Sun Roof Apparatus" U.S. Appl. No. 13/778,309, filed Feb. 27, 2013.

English Language Translation of JP 2000-108676 dated Apr. 18, 2000.
English Language Translation of JP 2005-41345, a counterpart of JP 4109583, dated Apr. 11, 2008.

* cited by examiner

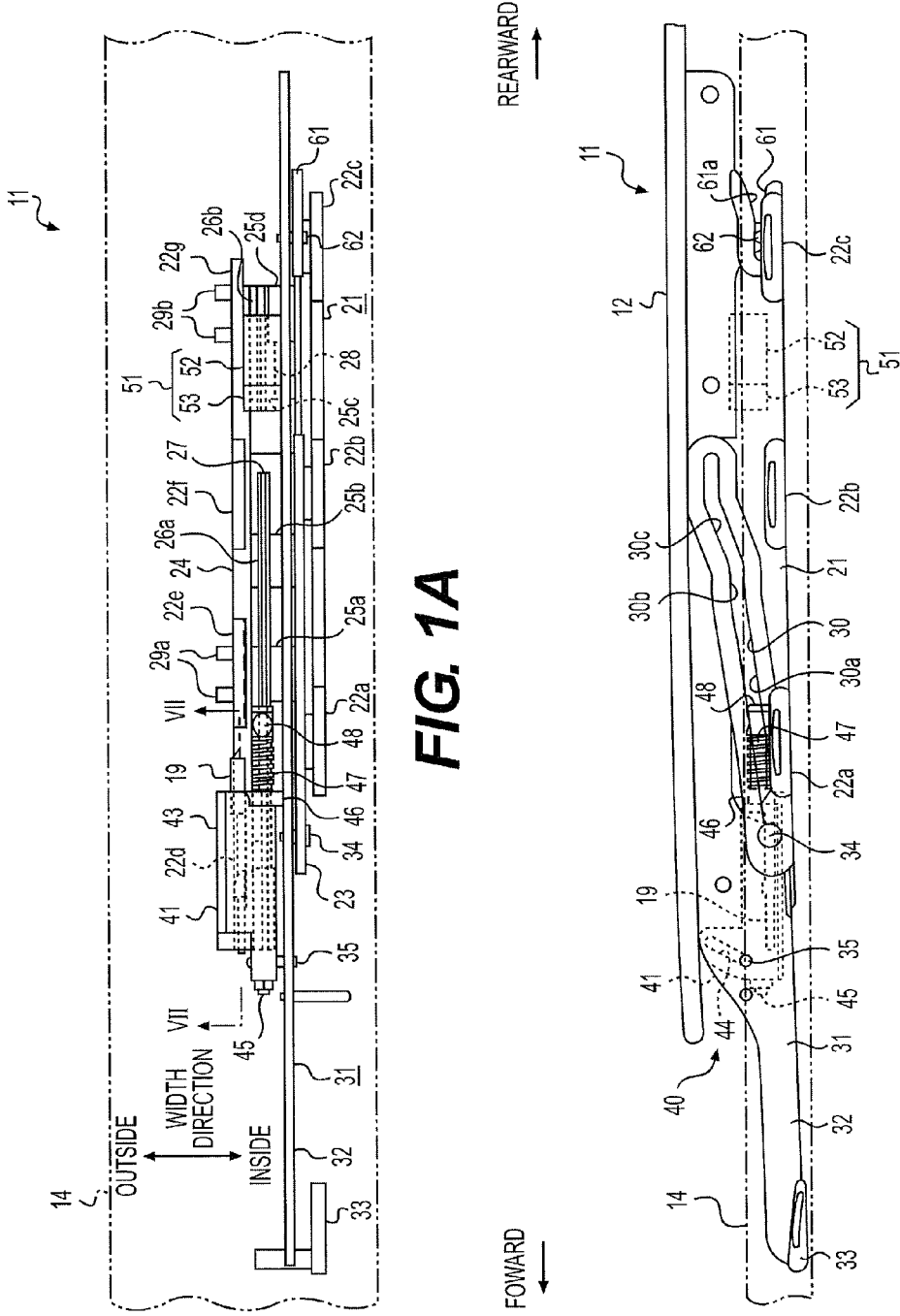

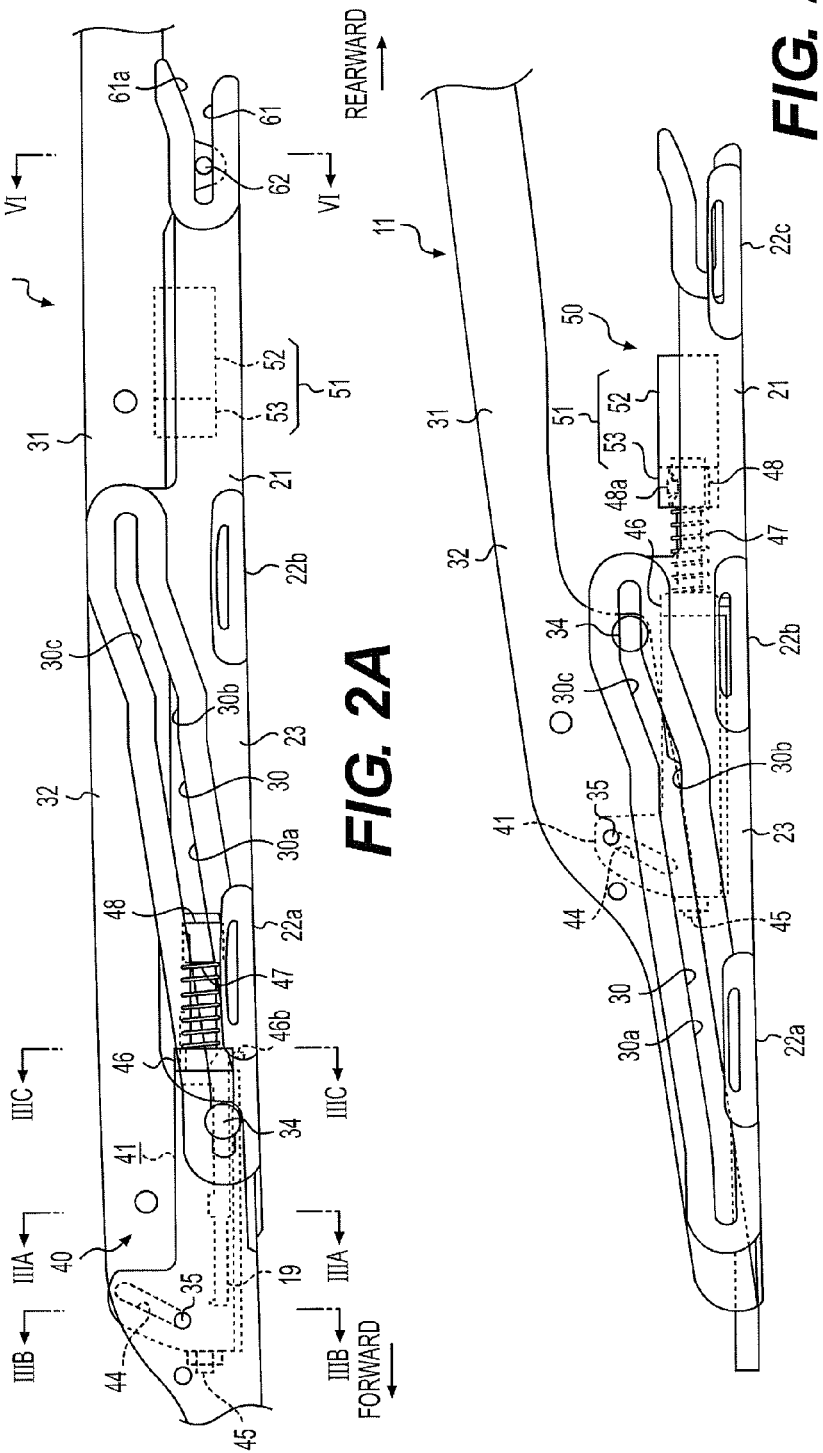

VEHICLE SUN ROOF APPARATUS

CROSS REFERENCE TO RELATED APPLICATIONS

This application is based on and claims priority under 35 U.S.C. §119 to Japanese Patent Application 2012-53300, filed on Mar. 9, 2012, the entire content of which is incorporated herein by reference.

TECHNICAL FIELD

This disclosure relates to a vehicle sun roof apparatus,

BACKGROUND DISCUSSION

In the related art, for example, a vehicle sun roof apparatus as disclosed in JP 2000-108676A (Reference 1) (a so-called outer slide sun roof) is known. In this apparatus, a link mechanism configured to support a movable panel includes a rear lift link configured to perform the swinging motion by a sliding motion of a first shoe, a front lift link configured to perform a swinging motion by a sliding motion of a second shoe, and a connecting rod configured to couple the rear lift link and the second shoe and cause the second shoe to perform a sliding motion by the swinging motion of the rear lift link. When the first shoe is caused to perform the sliding motion, the rear lift link performs a swinging motion and lifts a rear end of the movable panel, and in this process, the swinging motion of the rear lift link is transmitted to the second shoe via the connecting rod. By the sliding motion of the second shoe in association therewith, the front lift link is caused to perform the swinging motion so as to lift a front end of the movable panel. With the operation as described above, the movable panel is tilted up.

Subsequently, by causing the first shoe and the second shoe to slide, the movable panel slides outward in a state of being tilted up and brings an opening section formed in a roof panel into an opened state. In this case, since the rear lift link is brought into the swinging motion by the effect of an engagement structure set between the rear lift link and the first shoe, a tilt-up motion of the movable panel may be performed slowly by the setting of the engagement structure.

In the vehicle sun roof apparatus of JP 2000-108676A, the amount of movement (operation stroke) of the first shoe or the like required until the movable panel reaches the fully-opened state from the fully-closed state corresponds to the amount of movement of the first shoe or the like from the fully-closed state→tilt-up state→fully-opened state. Therefore, when the amount of movement of the first shoe or the like until the movable panel moves from the fully-closed state to the tilt-up state (hereinafter, referred to also as "tilt operation stroke") increases, securement of the amount of movement of the first shoe or the like until the movable panel moves to the fully-opened state, that is, the amount of opening of the movable panel becomes difficult.

In contrast, since the tilt operation stroke corresponds to a segment of a high-load state during which the movable panel moves upward and downward, it is preferable to secure the tilt operation stroke as long as possible. When it is assumed that the tilt operation stroke is reduced, a load per unit operation stroke increases, and the size of an electric power source (motor or the like) for driving the first shoe or the like needs to be increased correspondingly.

In the vehicle sun roof apparatus (outer slide sun roof) disclosed in Japanese Patent No. 4109583 (Reference 2), a guide rail projecting toward the front so that the guide rail that allows a shoe to slide therein penetrates through a front frame (housing) is proposed. Accordingly, for example, a supporting span of the movable panel may be widened while increasing the amount of opening of the movable panel, or without impairing the amount of opening of the movable panel.

However, an effect of increase of the amount of opening of the movable panel by providing the guide rail so as to penetrate through the front frame is insignificant, and the securement of the amount of opening is still difficult.

A need thus exists for a vehicle sun roof apparatus which is not susceptible to the drawback mentioned above.

SUMMARY

In order to solve the above-described problem, according to an aspect of this disclosure, there is provided a vehicle sun roof apparatus including:

a movable panel configured to open and close an opening section formed in a roof portion of a vehicle;

a guide rail provided at an edge portion of the opening section in the vehicle width direction and extending in the fore-and-aft direction of the vehicle;

a sliding member linked to an edge portion of the movable panel in the vehicle width direction, provided along the guide rail so as to be movable in the fore-and-aft direction of the vehicle, and driven to be moved by an electric drive source;

a check mechanism configured to release a movement lock of the movable panel by locking the movement of the movable panel and transferring the movable panel to a tilt-up state by moving a rear portion upward about a supporting point at a front portion of the movable panel when the sliding member moves forward of the vehicle in a fully-closed state of the movable panel, and maintaining the tilt-up state when the sliding member moves further forward of the vehicle and then moves rearward of the vehicle in the tilt-up state; and an engagement and disengagement switching mechanism provided with a first member supported by either the sliding member or the edge portion of the movable panel in the vehicle width direction, and a second member supported by the other one of the sliding member and the edge portion of the movable panel in the vehicle width direction, and configured to engage the first member and the second member by pressing either one of the first member and the second member by the other one of the first member and the second member so that the movable panel moves integrally when the sliding member moves rearward of the vehicle thereafter.

BRIEF DESCRIPTION OF THE DRAWINGS

The foregoing and additional features and characteristics of this disclosure will become more apparent from the following detailed description considered with the reference to the accompanying drawings, wherein:

FIGS. 1A and 1B are plan view and a side view illustrating an embodiment disclosed here;

FIGS. 2A and 2B are side views illustrating a fully-closed state and a second tilt-up state of a movable panel;

DETAILED DESCRIPTION

An embodiment disclosed here will be explained with reference to FIG. 1 to FIG. 8.

Figure 8:
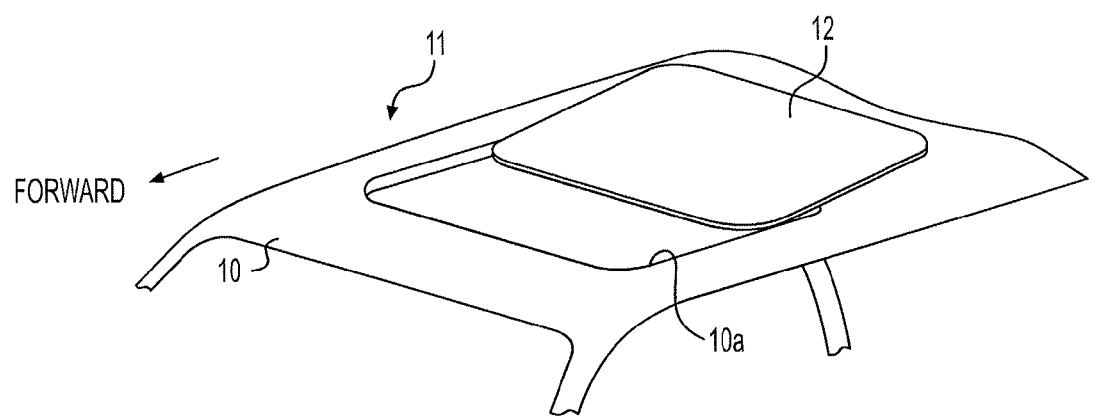
FIG. 8 is a perspective view illustrating a roof viewed from obliquely above.

As illustrated in FIG. 8, a roof 10 as a roof portion of a vehicle such as an automotive vehicle is formed with a substantially square roof opening 10a as an opening section, and includes a sun roof apparatus 11 configured to support a substantially square movable panel 12 formed of, for example, glass mounted thereon.

The movable panel 12 is mounted so as to be capable of performing a tilt-up motion rising a rear portion about a supporting point at a front portion thereof and a sliding motion in the fore-and-aft direction of the vehicle. In the opening and closing operation of the roof opening 10a by the movable panel 12, a system of sliding in a tilt-up state, so-called an outer sliding system is employed.

Subsequently, the structure of the sun roof apparatus 11 relating to the opening and closing operation of the movable panel 12 will be described. The sun roof apparatus 11 includes basically a pair of structures relating to the opening and closing operation of the movable panel 12 on both sides of the roof opening 10a in the vehicle width direction, and only the structure on one side in the vehicle width direction will be described in the following description.

As illustrated in FIGS. 1A and 1B, a guide rail 14 having a substantially constant cross section formed of an extruded material such as aluminum alloy extends in the fore-and-aft direction of the vehicle at an edge in the vehicle width direction of the roof opening 10a. The guide rail 14 is formed with a first rail portion 15 having a substantially C-shaped cross section opening upward of the vehicle as illustrated in FIGS. 3A to 30, and is formed with a second rail portion 16 adjacent to the first rail portion 15 outside in the vehicle width direction. The second rail portion 16 has a substantially T-shape in cross section in cooperation with a side wall of the first rail portion 15, and communicates with the first rail portion 15 at an opening formed on the side wall.

The guide rail 14 is further formed with a flange-shaped first guide portion 17 on an upper side of the outside portion of the first rail portion 15 in the vehicle width direction, and is formed with a flange-shaped second guide portion 18 on an upper side of the second rail portion 16.

Figure 7:
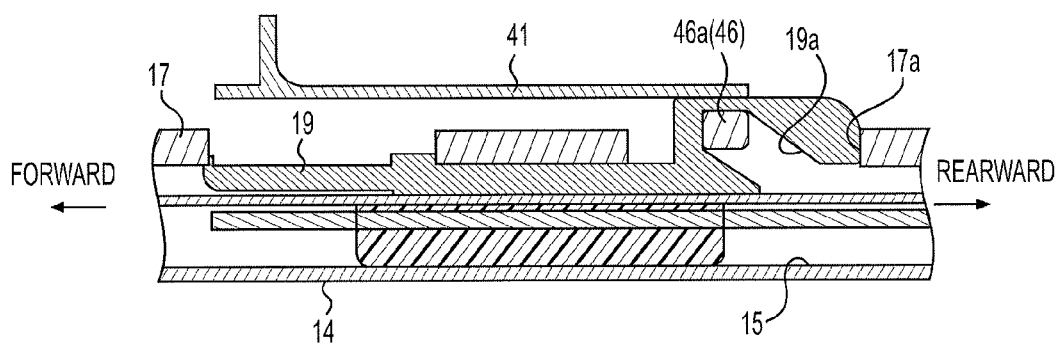
FIG. 7 is a cross-sectional view taken along the line VII-VII in FIG. 1A.

The first guide portion 17 is formed with a notched portion 17a at a predetermined position rather on the front side in the fore-and-aft direction of the vehicle as illustrated in FIG. 7. Then, the guide rail 14 includes a check block 19 placed on the outside portion of the first rail portion 15 in the vehicle width direction, fitted to the first guide portion 17 through the notched portion 17a, and formed of, for example, a resin material fixed thereto. The check block 19 is formed into a hook shape having an engaging groove 19a communicating from top to bottom of the first guide portion 17 on the rear side of the vehicle. The engaging groove 19a is inclined so as to extend downward as it goes rearward of the vehicle, and communicates with a portion below the first guide portion 17 at a lower end thereof.

As illustrated in FIGS. 1A and 1B, a drive shoe 21 as a sliding member formed by integrating a metallic plate and a resin, for example, is mounted on the first rail portion 15 of the guide rail 14 so as to be movable in the fore-and-aft direction of the vehicle. In other words, the drive shoe 21 includes three shoe portions 22a, 22b, and 22c sliding inside of the first rail portion 15 in the vehicle width direction (the lower side in FIG. 1A) arranged in a line in the fore-and-aft direction of the vehicle, and four shoe portions 22d, 22e, 22f, and 22g sliding outside of the first rail portion 15 in the vehicle width direction (the upper side in FIG. 1A) arranged in a line in the fore-and-aft direction of the vehicle. The drive shoe 21 also includes a vertical wall portion 23 provided upright at an intermediate portion of the first rail portion 15 rather on the inside of the vehicle width direction and configured to connect the shoe portions 22a to 22c so as to extend in the fore-and-aft direction of the vehicle and a substantially elongated continuous wall portion 24 configured to connect the shoe portions 22d to 22g on the outside portion of the first rail portion 15 in the vehicle width direction so as to extend in the fore-and-aft direction of the vehicle. The drive shoe 21 further includes four communicating portions 25a, 25b, 25c, and 25d connecting the vertical wall portion 23 and the continuous wall portion 24 in the width direction arranged in a line in the fore-and-aft direction of the vehicle.

The communicating portions 25a and 25d include extending strips 29a and 29b penetrating through the shoe portions 22e and 22g and entering the second rail portion 16 on the outside in the vehicle width direction, respectively. The extending strips 29a and 29b are coupled to be driven by an electric drive source (not illustrated), such as an electric motor via a band-shaped drive belt (not illustrated) sliding on the second rail portion 16 in the fore-and-aft direction of the vehicle. Therefore, the drive shoe 21 moves in the fore-and-aft direction of the vehicle by the drive belt driven by the electric drive source to move in the fore-and-aft direction of the vehicle along the guide rail 14 (the second rail portion 16) while causing the shoe portions 22a to 22c and the shoe portions 22d to 22g to slide along the inside and the outside of the first rail portion 15 in the vehicle width direction, respectively.

The drive shoe 21 includes a substantially rib-shaped first projecting portion 26a extending across the front side both communicating portions 25a and 25b to a front end of the continuous wall portion 24 in the fore-and-aft direction of the vehicle and a substantially rib-shaped second projecting portion 26b extending across the rear side both communicating portions 25c and 25d to a rear end of the continuous wall portion 24 in the fore-and-aft direction of the vehicle. The first and second projecting portions 26a and 26b are arranged on the same line in the fore-and-aft direction of the vehicle in the intermediate portion of the first rail portion 15 rather on the outside of the first rail portion 15 in the vehicle width direction. The first projecting portion 26a projects rearward of the communicating portion 25b toward the second projecting portion 26b. However, a gap 27 is set between the first and second projecting portions 26a and 26b in the fore-and-aft direction of the vehicle. A substantially rib-shaped restricting portion 28 extending in the fore-and-aft direction of the vehicle is formed in between the both communicating portions 25c and 25d in parallel thereto on the inside of the second projecting portion 26b in the vehicle width direction.

As illustrated in FIG. 1B, the vertical wall portion 23 is formed with a guide groove 30 opening in the vehicle width direction and extending in the fore-and-aft direction of the vehicle. The guide groove 30 includes a first inclined portion 30a inclining so as to extend upward as it goes rearward and a straight line portion 30b extending approximately parallel to the guide rail 14 so as to continue from a rear end of the first inclined portion 30a and, in addition, includes a second inclined portion 30c extending continuously from a rear end of the straight line portion 30b so as to extend upward as it goes rearward.

The drive shoe 21 includes a substantially U-shaped holding groove 61 opening rearward of the vehicle at a rear end portion of the vertical wall portion 23. The holding groove 61 is inclined so as to extend upward as the upper portion on the opening end side goes rearward, thereby forming a guiding portion 61a.

In contrast, a supporting bracket 31 formed of, for example, a metallic plate extending in the fore-and-aft direction of the vehicle is secured on an edge portion of a lower surface of the movable panel 12 in the vehicle width direction. The supporting bracket 31 extends over the substantially entire length of the movable panel 12 and includes a plate-shaped vertical wall portion 32 pending downward of the movable panel 12. The vertical wall portion 32 is provided on the outside of the vertical wall portion 23 in the vehicle width direction so as to be sandwiched between the vertical wall portion 23 and the first projecting portion 26a of the drive shoe 21 in parallel thereto in the vehicle width direction. Then, a front end of the vertical wall portion 32 is rotatably coupled to a driven shoe 33 formed of a resin about an axial line extending in the vehicle width direction. The driven shoe 33 is mounted on the first rail portion 15 of the guide rail 14 on the front side of the drive shoe 21 (the shoe portions 22a to 22c) so as to be movable in the fore-and-aft direction of the vehicle. The movable panel 12 supported by the supporting bracket 31 performs a tilt up motion by rising the rear portion about a supporting point at the front portion where the vertical wall portion 32 is coupled to the driven shoe 33, and performs a tilt-down motion by lowering the rear portion about a supporting point at the front portion.

A substantially column-shaped elevating guide pin 34 projecting inward in the vehicle width direction and formed of a metallic material to be fitted into the guide groove 30 so as to be movable is secured at a front end portion of the supporting bracket 31 (the vertical wall portion 32).

As illustrated in FIG. 2A, the elevating guide pin 34 is set to be arranged at a lower end of the guide groove 30 (the first inclined portion 30a) when the movable panel 12 is fully closed. Therefore, when the drive shoe 21 moves toward the front of the vehicle along the guide rail 14 (the first rail portion 15) in this state, the elevating guide pin 34 guided by the guide groove 30 moves up along the first inclined portion 30a and reaches the straight line portion 30b. At this time, the movable panel 12 rotates about a supporting point at the front portion of the supporting bracket 31 in conjunction with the upward movement of the supporting bracket 31 (the elevating guide pin 34) with respect to the drive shoe 21, so that the tilt-up motion in which the rear portion moves upward is performed (a first tilt-up state).

Subsequently, when the drive shoe 21 further moves toward the front of the vehicle along the guide rail 14 (the first rail portion 15), as illustrated in FIG. 2B, the elevating guide pin 34 guided by the guide groove 30 moves up along the second inclined portion 30c and reaches a terminal end thereof. At this time, the movable panel 12 further rotates about a supporting point at the front portion of the supporting bracket 31 in conjunction with the upward movement of the supporting bracket 31 (the elevating guide pin 34) with respect to the drive shoe 21, so that the tilt-up motion in which the rear portion further moves upward is performed (a second tilt-up state).

In contrast, when the drive shoe 21 moves from the tilt-up state (the first or second tilt-up state) of the movable panel 12 to rearward of the vehicle, the operation in the substantially reverse process is performed.

As illustrated in FIG. 2A, a substantially column-shaped locking pin 35 formed of a metallic material projecting inward in the vehicle width direction is secured at the front end portion, which is the front side of the elevating guide pin 34 of the supporting bracket 31 (the vertical wall portion 32). A substantially column-shaped holding pin 62 formed of a metallic material projecting inward in the vehicle width direction is secured at a rear end portion, which is the rear side of the elevating guide pin 34 of the supporting bracket 31 (the vertical wall portion 32). The holding pin 62 is locked into the holding groove 61 as illustrated also in FIG. 6 when the movable panel 12 is in the fully-closed state. It is for suppressing uplift of the movable panel 12 when the movable panel 12 is in the fully-closed state, or for introducing the movable panel 12 smoothly into the fully-closed state when the movable panel 12 is in the course of being transferred to the fully-closed state.

Figure 3A:
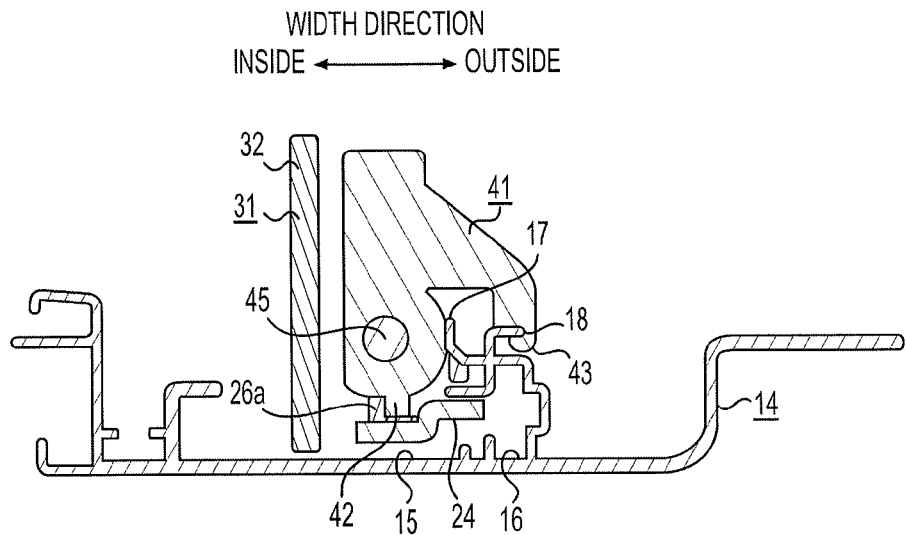
FIGS. 3A to 3C are cross-sectional views taken along the lines IIIA-IIIA, IIIB-IIIB, and IIIC-IIIC in FIG. 2.
Figure 3B:
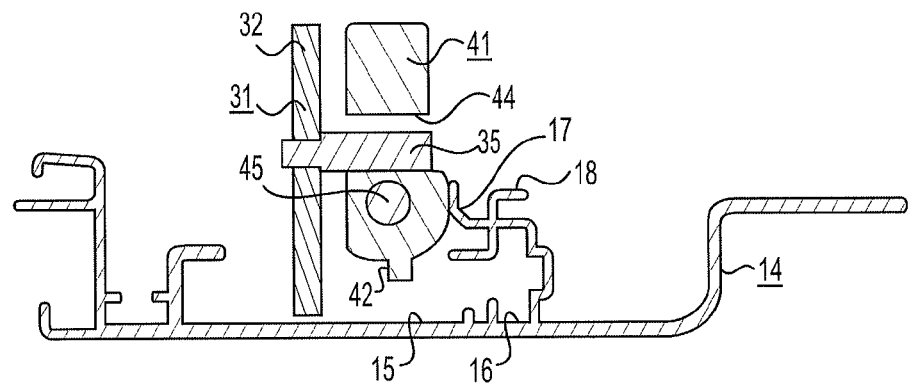

As illustrated in FIG. 1A, a slide check 41 as a second sliding member formed of, for example, a resin material is arranged on and supported by the first projecting portion 26a of the drive shoe 21. In other words, as illustrated in FIG. 3A, the slide check 41 includes a substantially rib-shaped guide portion 42 configured to project downward so as to abut against an outside surface of the first projecting portion 26a in the vehicle width direction and placed on the drive shoe 21 between the slide check 41 and the continuous wall portion 24, and includes a fitting portion 43 fitted to the second guide portion 18 of the guide rail 14 so as to be slidable in the fore-and-aft direction of the vehicle. As illustrated in FIGS. 3A and 3B, the slide check 41 abuts against the inside surface of the first guide portion 17 of the guide rail 14 in the vehicle width direction. The slide check 41 is movable along the guide rail 14 in the fore-and-aft direction of the vehicle by bringing the guide portion 42 into sliding contact with the outside surface of the first projecting portion 26a in the vehicle width direction on the drive shoe 21 and sliding the fitting portion 43 on the second guide portion 18.

As illustrated in FIGS. 2A and 2B, an elongated allowing hole 44 into which the locking pin 35 is fitted no as to be movable is formed at a front end portion of the slide check 41. The allowing hole 44 is inclined linearly so as to extend upward as it goes rearward of the vehicle. In other words, the slide check 41 is coupled to the supporting bracket 31 via the locking pin 35 to be fitted into the allowing hole 44. The slide check 41 maintains the above-described state on the drive shoe 21 by allowing the locking pin 35 to run freely in the allowing hole 44 when the movable panel 12 supported by the supporting bracket 31 performs the tilt-up motion (or the tilt-down motion). In other words, the slide check 41 allows the movable panel 12 to be transferred to the tilt-up state (or the fully-closed state) in association with the movement of the drive shoe 21 in the fore-and-aft direction of the vehicle by allowing the locking pin 35 to run freely in the allowing hole 44. The slide check 41 locks the movement of the locking pin 35 (the supporting bracket 31) in the fore-and-aft direction of the vehicle by the allowing hole 44 when a tilting motion of the movable panel 12 is restricted. Therefore, the slide check 41 moves in the fore-and-aft direction of the vehicle to cause the movable panel 12 supported by the supporting bracket 31 to move integrally (the sliding motion) therewith in the fore-and-aft direction of the vehicle.

Figure 3C:
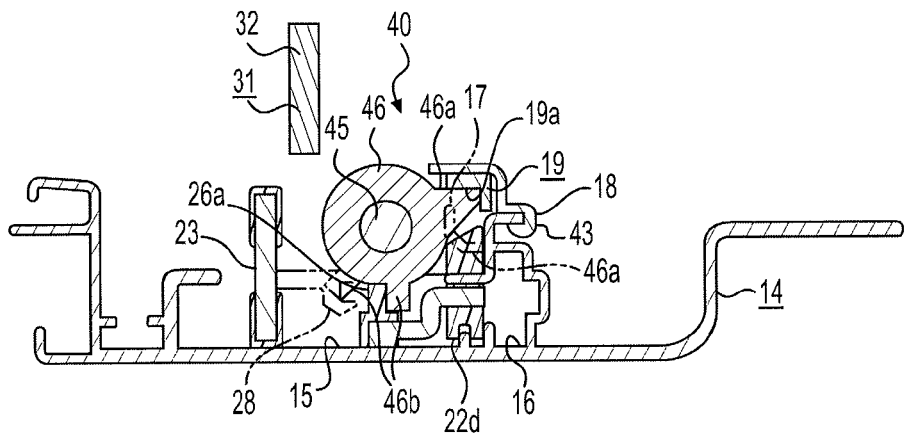

A substantially column-shaped supporting shaft 45 having a centerline extending in the fore-and-aft direction of the vehicle penetrates through the slide check 41 in the fore-and-aft direction of the vehicle. The supporting shaft 45 is fastened to the slide check 41 so as not to be capable of rotating. A substantially disc-shaped rotation check 46 is axially supported at a rear end portion of the supporting shaft 45 penetrating through the slide check 41 so as to be adjacent to the slide check 41. Therefore, the axial line of the rotation check 46 coincides with the centerline of the supporting shaft 45. As illustrated in FIG. 3C, the rotation check 46 includes a substantially triangular claw-shaped engaging projection 46a projecting radially outward at a predetermined angular position (the angular position facing rightward in the drawing) about the supporting shaft 45, and includes a substantially rectangular-shaped pressed portion 46b projecting radially outward at a predetermined angular position (the angular position facing downward in the drawing) about the supporting shaft 45. For example, in the fully-closed state of the movable panel 12, the engaging projection 46a of the rotation check 46 is locked into the engaging groove 19a of the check block 19, and the pressed portion 46b thereof abuts against the outside surface of the first projecting portion 26a in the vehicle width direction. Therefore, in the fully-closed state of the movable panel 12, the rotation check 46 is locked so as not to rotate by the first projecting portion 26a or the like in a state in which the engaging projection 46a is locked into the engaging groove 19a of the check block 19. Accordingly, the movement of the rotation check 46 in the fore-and-aft direction of the vehicle is locked and the movement in the fore-and-aft direction of the vehicle of the slide check 41 is locked together with the rotation check 46. Since the movement of the supporting bracket 31 coupled to the slide check 41 via the allowing hole 44 in the fore-and-aft direction of the vehicle is also locked, the movable panel 12 is only allowed to be transferred from the fully-closed state to the tilt-up state. The check block 19, the slide check 41, and the rotation check 46 constitute a check mechanism 40.

As described above, the gap 27 is set between the first and second projecting portions 26a and 26b. Therefore, when the first projecting portion 26a passes through the pressed portion 46b in association with the movement of the drive shoe 21 forward of the vehicle, the rotation check 46 is allowed to rotate in the gap 27. Therefore, in this state, when the rotation check 46 moves rearward of the vehicle together with the drive shoe 21, the rotation check 46 rotates clockwise as the engaging projection 46a is guided to the engaging groove 19a as illustrated in a double-dashed chain line in FIG. 3C. The engaging projection 46a enters below the first guide portion 17. Accordingly, the rotation of the rotation check 46 is locked. At the same time, the pressed portion 46b passes through the position of the first projecting portion 26a and is arranged inside of the first projecting portion 26a in the vehicle width direction. At this time, the pressed portion 46b is arranged on a movement locus of the restricting portion 28 of the drive shoe 21 in the fore-and-aft direction of the vehicle.

Figure 4:
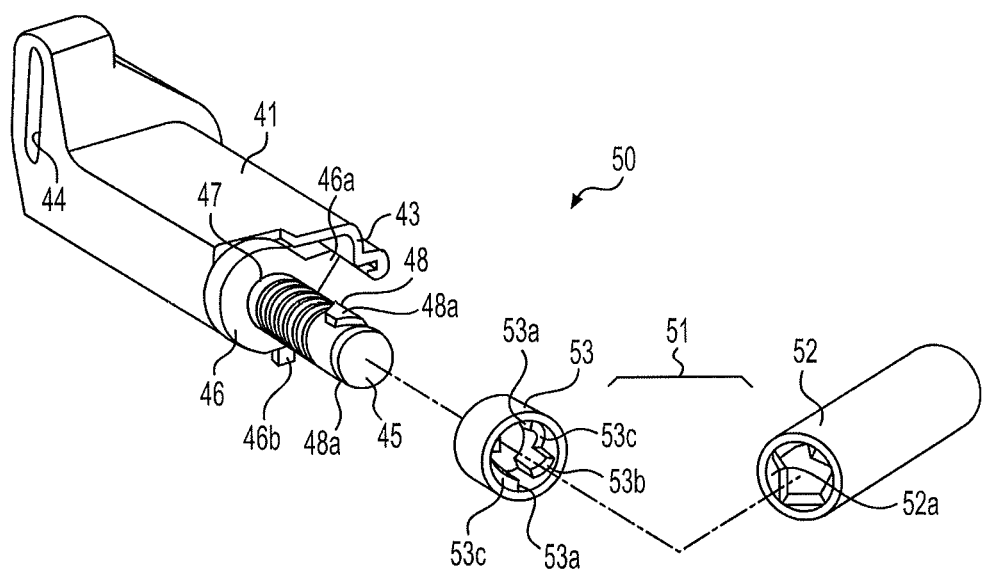
FIG. 4 is an exploded perspective view illustrating an engagement and disengagement switching mechanism.
Figure 5:
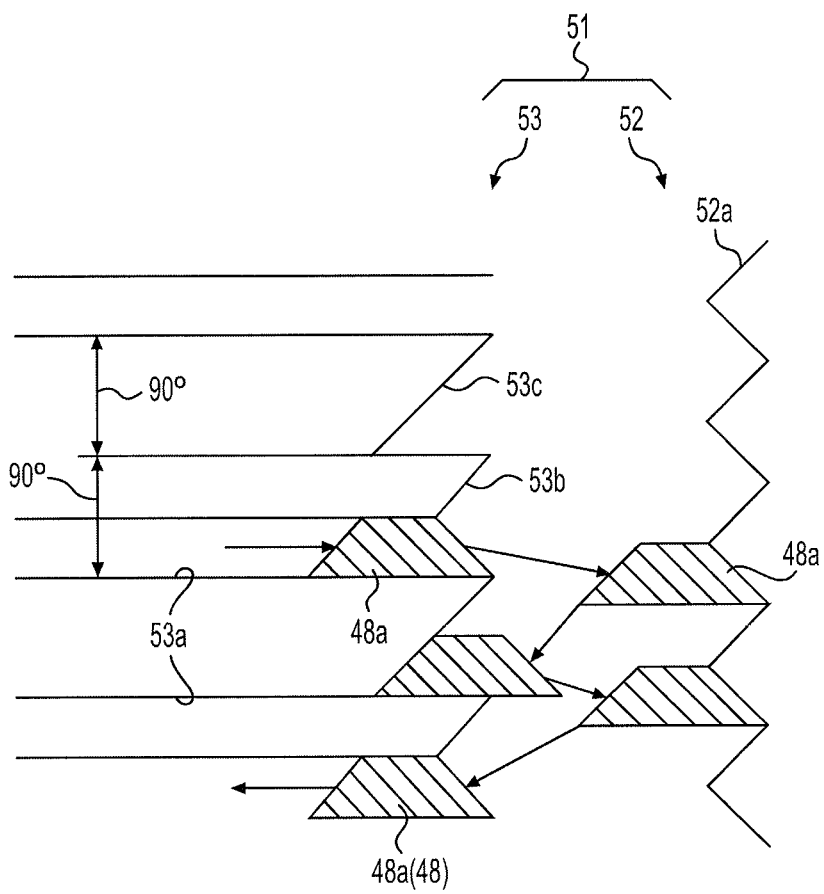
FIG. 5 is an explanatory drawing illustrating an operation of the engagement and disengagement switching mechanism by deploying the engagement and disengagement switching mechanism in the circumferential direction.
Figure 6:
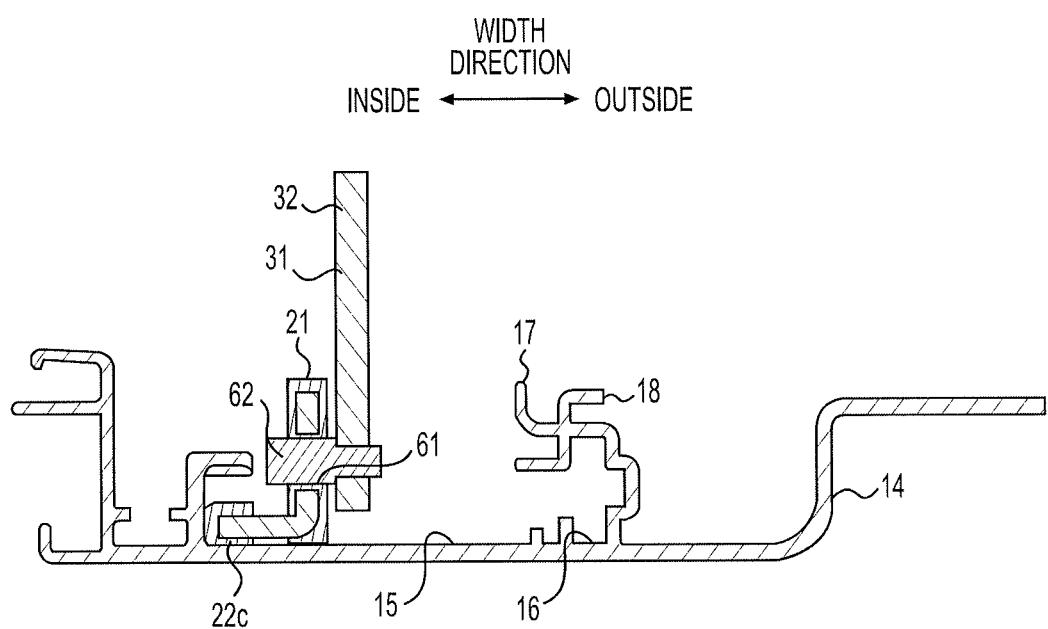
FIG. 6 is a cross-sectional view taken along the line VI-VI in FIG. 2.

As illustrated in FIGS. 2A and 2B, a rotating cam 48 as a second member is rotatably coupled to the rear end portion of the supporting shaft 45 penetrating through the slide check 41 via a coil spring 47 wound around the supporting shaft 45. Therefore, the axial line of the rotating cam 48 (a second axial line) coincides with the centerline of the supporting shaft 45. In other words, the rotating cam 48 is arranged coaxially with the rotation check 46. As illustrated in FIG. 4 and FIG. 5, the rotating cam 48 includes a pair of second cam teeth 48a having a substantially isosceles trapezoidal shape having a long side and a short side extending in the fore-and-aft direction of the vehicle. The second cam teeth 48a are arranged so as to face in the radial direction having a center at the axial line of the rotating cam 48. The respective second cam teeth 48a extend within a range of an angle (45° in this embodiment) smaller than a predetermined angle (90° in this embodiment) in the circumference direction having a center at the axial line of the rotating cam 48.

In contrast, as illustrated in FIG. 1A, a fixed cam 51 as a first member formed of, for example, a resin material, is arranged on and supported by the second projecting portion 26b of the drive shoe 21. The fixed cam 51 is at a distance from the rotating cam 48 at a position of the drive shoe 21 which corresponds to a case where the movable panel 12 is transferred at least from the fully-closed state to the first tilt-up state. The fixed cam 51 is overlapped with the rotating cam 48 in position in the fore-and-aft direction of the vehicle at the position of the drive shoe 21 which corresponds to the case where the movable panel 12 is transferred to the second tilt-up state as illustrated in FIG. 2B.

As illustrated in FIG. 4, the fixed cam 51 includes a substantially bottomed cylindrical-shaped first fixed-side member 52 arranged on the side apart from the slide check 41. As illustrated in FIG. 5, a plurality of substantially triangle teeth-shaped first cam teeth 52a disposed at intervals of the predetermined angle (90°) about the axial line thereof and projecting and being depressed in the direction of the axial line are formed at a front end portion (an opening end portion) of the first fixed-side member 52.

As illustrated in FIG. 4, the fixed cam 51 includes a substantially bottomed cylindrical-shaped second fixed-side member 53 arranged on the side in the vicinity of the slide check 41. A pair of opened portions 53a communicating along the direction of the axial line thereof are formed on an inner peripheral portion of the second fixed-side member 53 so as to face in the radial direction. As illustrated in FIG. 5, rear end portions of each of the opened portion 53a on the upper side in the drawing forms a guide portion 53b inclined so as to be widened gradually as it goes to a rear end. The opened portion 53a communicating over the entire length of the second fixed-side member 53 in the direction of the axial line extends within a range of the same angle (45°) as the first cam teeth 52a in the circumferential direction about the axial line of the fixed cam 51, and the opened portion 53a including the guide portion 53b extends within the range of the predetermined angle (90°) in the circumferential direction.

As illustrated in FIG. 4, a pair of locking portions 53c inclined toward the front of the vehicle as they go from the opened portions 53a toward the guide portions 53b between the both opened portions 53a in the circumferential direction are formed at a rear end portion (an opening end portion) of the second fixed-side member 53. The respective locking portions 53c extend within the range of the predetermined angle (90°) in the circumferential direction about the axial line of the fixed cam 51. Both apexes at which the first cam teeth 52a change the direction of extension in the fore-and-aft direction of the vehicle face the respective locking portions 53c in the fore-and-aft direction of the vehicle in the intermediate portion thereof in the circumferential direction. In other words, a phase difference of a predetermined angle smaller than the predetermined angle (90°) is set between the both apexes of the locking portions 53c at which the direction of extension in the fore-and-aft direction of the vehicle changes and the both apexes of the first cam teeth 52a at which the direction of extension in the fore-and-aft direction of the vehicle changes.

In such a configuration, in a state in which the rotating cam 48 (the slide check 41) and the fixed cam 51 are apart from each other in the fore-and-aft direction of the vehicle (for example, until the movable panel 12 is transferred from the fully-closed state to the first tilt-up state), the angular positions of the second cam teeth 48a are urged and maintained by the coil spring 47 so as to coincide with the angular positions of the opened portions 53a. Therefore, when the fixed cam 51 moves forward of the vehicle together with the drive shoe 21 so as to transfer the movable panel 12 to the second tilt-up state, as illustrated in FIG. 5, the second cam teeth 48a pass through the opened portions 53a and are pressed by the first cam teeth 52a because paths for the first cam teeth 52a are opened by the opened portions 53a. At this time, the second cam teeth 48a are guided by the first cam teeth 52e and rotate by an amount corresponding to the above-described phase difference between the locking portions 53c and the first cam teeth 52a. Accordingly, when the fixed cam 51 moves rearward of the vehicle together with the drive shoe 21, the paths for the first cam teeth 52a (the paths for retracting from the first cam teeth 52a) are closed by the locking portions 53c.

Therefore, when the fixed cam 51 moves rearward of the vehicle together with the drive shoe 21 so as to cause the movable panel 12 to perform a rearward sliding motion (that is, an opening operation), the second cam teeth 48a are locked by the locking portions 53c while being guided to be rotated by the locking portions 53c as illustrated in FIG. 5. By the engagement between the rotating cam 48 and the fixed cam 51 in this manner, the slide check 41 moves integrally rearward of the vehicle. The supporting bracket 31 coupled to the slide check 41 via the locking pin 35 also moves integrally rearward of the vehicle. The rotating cam 48 and the fixed cam 51 constitute an engagement and disengagement switching mechanism 50.

Here, the operation of the embodiment disclosed here will be described.

First of all, the movable panel 12 is assumed to be in the fully-closed state. At this time, the rotation check 46 is locked so as not to rotate by the first projecting portion 26a or the like in a state in which the engaging projection 46a is locked into the engaging groove 19a of the check block 19. Accordingly, the movement of the rotation check 46 in the fore-and-aft direction of the vehicle is locked and the movement of the slide check 41 in the fore-and-aft direction of the vehicle is locked together with the rotation check 46. Since the movement of the supporting bracket 31 coupled to the slide check 41 via the allowing hole 44 in the fore-and-aft direction of the vehicle is also locked, the movable panel 12 is only allowed to perform the tilt-up motion in which the rear portion moves upward about a supporting point at the front portion of the supporting bracket 31.

When the drive shoe 21 moves forward of the vehicle in this state, the locking pin 35 runs freely in the allowing hole 44 so as to move upward along the allowing hole 44 of the slide check 41, and the elevating guide pin 34 guided by the guide groove 30 moves up along the first inclined portion 30a and reaches the straight line portion 30b. Accordingly, the supporting bracket 31 (the elevating guide pin 34) moves upward with respect to the drive shoe 21, and hence the movable panel 12 is transferred to the first tilt-up state.

In the fully-closed state of the movable panel 12, the holding pin 62 of the supporting bracket 31 is locked into the holding groove 61 of the slide check 41. The holding pin 62 does not hinder the transfer of the movable panel 12 to the first tilt-up state (the tilt-up motion) even by coming apart from the holding groove 61 in association with the movement of the drive shoe 21 forward of the vehicle.

As described already, at the position of the drive shoe 21 which corresponds to the case where the movable panel 12 is transferred at least from the fully-closed state to the first tilt-up state, the rotating cam 48 and the fixed cam 51 of the engagement and disengagement switching mechanism 50 are apart from each other in the fore-and-aft direction of the vehicle. Therefore, when the drive shoe 21 moves rearward of the vehicle in the first tilt-up state of the movable panel 12, the locking pin 35 runs freely in the allowing hole 44 no as to move downward along the allowing hole 44 of the slide check 41, and the elevating guide pin 34 guided by the guide groove 30 slides down on the first inclined portion 30a and reaches a terminal end of the first inclined portion 30a. Accordingly, the supporting bracket 31 (the elevating guide pin 34) moves downward with respect to the drive shoe 21, and hence the movable panel 12 performs the tilt-down motion in which the rear portion moves downward about a supporting point at the front portion of the supporting bracket 31 and is transferred to the fully-closed state. In other words, the movable panel 12 performs only the tilting motion in association with the fore-and-aft movement of the drive shoe 21 as long as being translated between the fully-closed state and the first tilt-up state.

In contrast, when the drive shoe 21 moves further forward of the vehicle in the first tilt-up state of the movable panel 12, the locking pin 35 runs freely in the allowing hole 44 so as to move further upward along the allowing hole 44 of the slide check 41, and the elevating guide pin 34 guided by the guide groove 30 moves up along the second inclined portion 30c and reaches a terminal end thereof. Accordingly, the supporting bracket 31 (the elevating guide pin 34) moves further upward with respect to the drive shoe 21, and hence the movable panel 12 is transferred to the second tilt-up state. The rotation check 46 in which the first projecting portion 26a passes through the pressed portion 46b thereof in association with the movement of the drive shoe 21 forward of the vehicle is allowed to rotate in the gap 27.

At this time, the rotating cam 48 and the fixed cam 51 of the engagement and disengagement switching mechanism 50 are overlapped at the position in the fore-and-aft direction of the vehicle. Therefore, the second cam teeth 48a of the rotating cam 48 pass through the opened portions 53a and are pressed by the first cam teeth 52a because paths for the first cam teeth 52a are opened by the opened portions 53a. The second cam teeth 48a are guided by the first cam teeth 52a, and rotate by an amount corresponding to the above-described phase difference between the locking portions 53c and the first cam teeth 52a.

Subsequently, when the drive shoe 21 moves rearward of the vehicle, the second cam teeth 48a of the rotating cam 48 is locked by the locking portions 53c while being guided to be rotated by the locking portions 53c of the second fixed-side member 53. By the engagement between the rotating cam 48 and the fixed cam 51 in this manner, the rotation check 46 and the slide check 41 try to move integrally rearward of the vehicle.

At this time, the rotation check 46 allowed to rotate in the gap 27 rotates so that the engaging projection 46a enters a position below the first guide portion 17 by the engaging projection 46a being guided into the engaging groove 19a. The rotation check 46 is locked so as not to rotate in this state. Accordingly, the movement lock of the slide check 41 in the fore-and-aft direction of the vehicle is released and the movement of the supporting bracket 31 coupled to the slide check 41 via the allowing hole 44 or the like in the fore-and-aft direction of the vehicle is also released. At the same time, the pressed portion 46b passes through the position of the first projecting portion 26a and is arranged inside of the first projecting portion 26a in the vehicle width direction, and is arranged on the movement locus of the restricting portion 28 of the drive shoe 21 in the fore-and-aft direction of the vehicle.

Therefore, when the drive shoe 21 moves rearward of the vehicle, the rotation check 46 and the slide check 41 move integrally with the fixed cam 51 rearward of the vehicle. At this time, the distance between the rotation check 46 (the slide check 41) and the fixed cam 51 is maintained constantly in the fore-and-aft direction of the vehicle, so that the distance between the drive shoe 21 and the supporting bracket 31 in the fore-and-aft direction of the vehicle is also maintained constantly. Therefore, the movable panel 12 supported by the supporting bracket 31 moves rearward of the vehicle in the second tilt-up state, and opens the roof opening 10a. Accordingly, the movable panel 12 is brought into the opened state.

In the opened state of the movable panel 12, the rotation check 46 is locked so as not to rotate in a state in which the engaging projection 46a enters the portion below the first guide portion 17 as described above. At this time, the pressed portion 46b is arranged on the movement locus of the restricting portion 28 in the fore-and-aft direction of the vehicle. Therefore, when the drive shoe 21 moves forward of the vehicle in this state, the restricting portion 28 presses the pressed portion 46b, so that the slide check 41 moves forward of the vehicle integrally with the rotation check 46. It is for arranging the second cam teeth 48a of the rotating cam 48 and the first cam teeth 52a of the first fixed-side member 52 apart from each other in the fore-and-aft direction of the vehicle when the drive shoe 21 moves forward of the vehicle in the opened state of the movable panel 12 to avoid the first cam teeth 52a from pressing the second cam teeth 48a. In this case as well, the distance between the slide check 41 and the fixed cam 51 is maintained constantly in the fore-and-aft direction of the vehicle, so that the distance between the drive shoe 21 and the supporting bracket 31 in the fore-and-aft direction of the vehicle is also maintained constantly. Therefore, the movable panel 12 supported by the supporting bracket 31 moves forward of the vehicle in the second tilt-up state, and closes the roof opening 10a.

In association with the closing operation of the movable panel 12, when the movable panel 12 moves toward the state close to an initial state in which the movable panel 12 is transferred to the tilt-up state, the rotation check 46 is allowed to rotate in the gap 27 by the first projecting portion 26a passing through the pressed portion 46b. Therefore, the rotation check 46 rotates so that the engaging projection 46a enters an upper end of the engaging groove 19a by the engaging projection 46a being guided into the engaging groove 19a. The rotation check 46 is locked so as not to rotate in this state. Accordingly, the movement of the slide check 41 in the fore-and-aft direction of the vehicle is locked and the movement of the supporting bracket 31 coupled to the slide check 41 via the allowing hole 44 or the like in the fore-and-aft direction of the vehicle is also locked. At the same time, the pressed portion 46b passes through the position of the first projecting portion 26a and is arranged outside of the first projecting portion 26a in the vehicle width direction, and is swerved from the movement locus of the restricting portion 28 in the fore-and-aft direction of the vehicle.

Accordingly, the first cam teeth 52a press the second cam teeth 48a, and hence the second cam teeth 48a are guided by the first cam teeth 52a, and rotates by an amount corresponding to the phase difference between the locking portions 53c and the first cam teeth 52a. Accordingly, when the fixed cam 51 moves rearward of the vehicle together with the drive shoe 21 subsequently, the second cam teeth 48a are guided to be rotated by the guide portion 53b and the path to the first cam teeth 52a (the path for retracting from the first cam teeth 52a) is opened by the opened portions 53a. Therefore, the rotating cam 48 releases the engagement with the second fixed-side member 53 (the fixed cam 51) while allowing the second cam teeth 48a to pass through the opened portions 53a. Then, the fixed cam 51 moves rearward of the vehicle together with the drive shoe 21 while leaving the rotating cam 48 and the like.

At this time, when the locking pin 35 runs freely in the allowing hole 44 as moving downward along the allowing hole 44 of the slide check 41, and the elevating guide pin 34 is guided along the guide groove 30 so as to move downward, and hence the movable panel 12 performs the tilt-down motion and is transferred to the fully-closed state via the first tilt-up state.

When the movable panel 12 is transferred to the fully-closed state while performing the tilt-down motion, the holding pin 62 of the supporting bracket 31 moves gradually downward. In contrast, the holding groove 61 of the drive shoe 21 moves gradually rearward of the vehicle, which corresponds to the direction of opening thereof. Therefore, the holding groove 61 guides the holding pin 62 moving downward in the guiding portion 61a in association with the movement thereof rearward of the vehicle, so that the holding pin 62 is locked in so as to introduce the movable panel 12 into the fully-closed state.

As described above in detail, the following advantages are achieved according to this embodiment.

(1) According to the embodiment, when the drive shoe 21 moves further forward of the vehicle and then moves rearward of the vehicle in the first tilt-up state, the second tilt-up state is maintained and the movement lock of the movable panel 12 is released by the check mechanism 40. In contrast, the fixed cam 51 of the engagement and disengagement switching mechanism 50 presses the rotating cam 48, and hence the fixed cam 51 and the rotating cam 48 are engaged so that the movable panel 12 moves integrally when the drive shoe 21 moves rearward of the vehicle thereafter. Therefore, the movable panel 12 moves rearward of the vehicle integrally with the drive shoe 21, and hence is opened while being maintained in the second tilt-up state. In this case, the maximum amount of movement of the drive shoe 21 or the like which defines the fully-opened state of the movable panel 12 is not limited by the amount of movement of the drive shoe 21 in the direction opposite from the direction of the movable panel 12 (forward of the vehicle) when being brought into the tilt-up state. Therefore, the maximum amount of movement of the drive shoe 21 or the like which defines the fully-opened state of the movable panel 12, that is, the amount of opening of the movable panel 12 may be increased.

(2) According to the embodiment, the movement lock-and-unlock of the movable panel 12 by the check mechanism 40 is switched by engagement and disengagement between the engaging projection 46a and the engaging groove 19a in association with the rotation of the rotation check 46 about the axial line extending in the fore-and-aft direction of the vehicle. In contrast, the engagement between the fixed cam 51 of the engagement and disengagement switching mechanism 50 and the rotating cam 48 is realized by the movement of the drive shoe 21 further forward of the vehicle in the first tilt-up state, that is, by the movement along the axial line. Therefore, the movement lock-and-unlock of the movable panel 12 by the check mechanism 40 and the engagement between the fixed cam 51 of the engagement and disengagement switching mechanism 50 and the rotating cam 48 may be realized in conjunction with the movement of the drive shoe 21 in the fore-and-aft direction of the vehicle along the direction of movement of the drive shoe 21. Therefore, for example, by coupling the rotation check 46 to the rotating cam 48 and intensively arranging the rotating cam 48 and the rotation check 46, an apparatus reduced in size as a whole is achieved.

(3) According to the embodiment, the second cam teeth 48a pass the opened portions 53a and are pressed by the first cam teeth 52a when the drive shoe 21 moves further forward of the vehicle in the first tilt-up state, and the drive shoe 21 is pressed by the locking portions 53c when the drive shoe 21 moves rearward of the vehicle thereafter, so that the second cam teeth 48a rotate by the predetermined angle (90°) and locked by the locking portions 53c. In this manner, by the engagement between the fixed cam 51 and the rotating cam 48 caused by the locking between the locking portions 53c and the second cam teeth 48a, the movable panel 12 moves integrally with the drive shoe 21 moving rearward of the vehicle. Therefore, the engagement and disengagement switching mechanism 50 may bring the fixed cam 51 and the rotating cam 48 into engagement in a very simple structure such that second cam teeth 48a passed through the opened portions 53a are pressed by the first cam teeth 52a and the locking portions 53c in sequence to cause the same to rotate the predetermined angle.

(4) According to the embodiment, when the drive shoe 21 moves forward of the vehicle in the state in which the movable panel 12 is opened, the second tilt-up state is maintained in a state in which the movement lock of the movable panel 12 is released until the initial restored state in which the movable panel 12 is transferred from the fully-closed state to the first tilt-up state by the check mechanism 40. Then, the pressed portion 46b of the rotation check 46 is pressed by the restricting portion 28, the movable panel 12 moves forward of the vehicle integrally with the drive shoe 21, and is closed still in the second tilt-up state. In this case, the pressing of the second cam teeth 48a by the first cam teeth 52a is restricted by the pressing toward the movable panel 12 (the pressed portion 46b) by the restricting portion 28, and hence the motion of the engagement and disengagement switching mechanism 50 may be avoided from becoming unstable due to the rotation of the second cam teeth 48a, for example.

Subsequently, when the movable panel 12 becomes the restored state, the movement of the movable panel 12 is locked when the drive shoe 21 moves further forward of the vehicle, and maintenance in the second tilt-up state is released by the check mechanism 40. In contrast, the second cam teeth 48a are pressed by the first cam teeth 52a when the drive shoe 21 moves further forward of the vehicle in the restored state, and the drive shoe 21 is guided to the opened portions 53a when the drive shoe 21 moves rearward of the vehicle thereafter, so that the second cam teeth 48a rotate by the predetermined angle (90°) and pass through the opened portions 53a. In this manner, by the disengagement of the fixed cam 51 from the rotating cam 48, the drive shoe 21 moves rearward of the vehicle while leaving the movable panel 12. Therefore, the engagement and disengagement switching mechanism 50 may release the engagement between the fixed cam 51 and the rotating cam 48 in a very simple structure such that the second cam teeth 48a are pressed by the first cam teeth 52a and guided by the opened portions 53a (the guide portion 53b) to cause the same to rotate by the predetermined angle.

Then, the rear portion of the movable panel 12 moves downward about a supporting point at the front portion thereof in association with the movement of the drive shoe 21 rearward of the vehicle and hence the fully-closed state is achieved. In this case, since a sufficient amount of movement of the drive shoe 21 when moving the movable panel 12 from the tilt-up state to the fully-closed state may be secured, the load (motor output) per unit amount of movement of the drive shoe 21 may be reduced, and hence the increase in size of the electric power source may be avoided.

Specifically, when a function to determine that something is caught by in the movable panel 12 when the variability of rotating speed of the motor exceeds a predetermined threshold value (hereinafter, referred to also as "reverse rotation load") in association with the opening and closing operation of the movable panel 12 and reverse the movement of the movable panel 12 is provided, the reverse rotation load may be reduced by the small variability of the rotation speed during the normal operation. In other words, even though the reverse rotation load is reduced, the probability of erroneous determination as the something is caught thereby by the above-described function may be reduced. In this case, there is a probability of satisfying 100N or lower under European Regulation, for example, and there is a probability of achievement of automatic closure of the movable panel 12.

(5) According to the embodiment, by the second cam teeth 48a (the rotating cam 48) being coupled to the slide check 41 of the check mechanism 40 so as to be rotatable, the second cam teeth 48a (the rotating cam 48) may be intensively arranged on the check mechanism 40, and hence an apparatus reduced in size as a whole is achieved. Specifically, by the coaxial arrangement of the rotation check 46 and the second cam teeth 48a, further reduction in size is achieved.

(6) According to the embodiment, the maximum amount of movement of the drive shoe 21 or the like which defines the tilt-up state of the movable panel 12 is not limited by the amount of movement of the drive shoe 21 in the direction opposite from the direction (rearward of the vehicle) of the movable panel 12 when being brought into the opened state. Therefore, the maximum amount of movement of the drive shoe 21 or the like which defines the tilt-up state of the movable panel 12, that is, the amount of opening of the movable panel 12 in the tilt-up state may be increased.

(7) According to the embodiment, when the movable panel 12 is transferred from the first tilt-up state to the fully-closed state, the holding pin 62 is locked in the holding groove 61 so as to introduce the movable panel 12 into the fully-closed state. Therefore, even when the movable panel 12 (the supporting bracket 31) flip-flops by the influence of air resistance when the movable panel 12 is transferred from the first tilt-up state to the fully-closed state at the time of high-speed traveling of the vehicle, for example, the movable panel 12 may be introduced into the fully-closed state smoothly by the holding pin 62 locked in the holding groove 61. In the fully-closed state of the movable panel 12, the fully-closed state may be maintained more robustly by the holding pin 62 locked in the holding groove 61.

(8) According to the embodiment, when the movable panel 12 is in the fully-closed state, the movable panel 12 is transferred to the tilt-up state by moving the drive shoe 21 forward of the vehicle. In other words, in the fully-closed state of the movable panel 12, the drive shoe 21 is arranged rather on the back side assuming the movement thereof in the direction forward of the vehicle. Therefore, the holding groove 61 relating to the maintenance of the fully-closed state may be provided on the drive shoe 21 without extending the drive shoe 21 significantly rearward of the vehicle.

(9) According to the embodiment, the holding groove 61 configured to introduce the movable panel 12 into the fully-closed state is provided integrally with the drive shoe 21, so that the number of components may be reduced in comparison with a case of introducing the movable panel 12 into the fully-closed state by a specific component (such as a rear link), for example.

(10) According to the embodiment, the holding pin 62 is guided by the holding groove 61 opening in the direction of movement of the drive shoe 21 (rearward of the vehicle) when the movable panel 12 is transferred from the first tilt-up state to the fully-closed state, and hence the movable panel 12 may be introduced into the fully-closed state further smoothly.

The embodiment described above may be modified as follows.

In the embodiment described above, the straight line portion 30b of the guide groove 30 may be eliminated.

In the embodiment described above, the movement lock-and-unlock of the movable panel 12 by the check mechanism 40 is switched by engagement and disengagement between the engaging projection 46a and the engaging groove 19a in association with the rotation of the rotation check 46. In contrast, the check mechanism configured to switch the movement lock-and-unlock of the movable panel 12 by moving the check in the vertical direction of the vehicle or in the vehicle width direction may also be employed as long as the check mechanism realizes the movement lock-and-unlock of the movable panel 12 by, for example, electrical control or the like. In other words, the arrangement and the structure of the check mechanism are arbitrary.

in the embodiment described above, the slide check 41, the rotation check 46, and the rotating cam 48 are integrally coupled. However, the slide check 41, the rotation check 46, and the rotating cam 48 may be coupled to a peripheral edge portion of the movable panel 12 individually.

In the embodiment described above, the rotation check 46 and the engagement and disengagement switching mechanism 50 (the rotating cam 48 and the fixed cam 51) are coaxially arranged. However, the axial lines thereof may be different from each other as long as the axial lines extend in the fore-and-aft direction of the vehicle.

In the embodiment described above, when the movable panel 12 is operated from the opened state to the closed state, the pressed portion 46b of the rotation check 46 is pressed by the restricting portion 28. However, a configuration in which a suitable position of the movable panel 12 may be pressed by the restricting portion 28 may also be employed as long as this configuration does not hinder the function thereof.

In the embodiment described above, two stages including the first tilt-up state and the second tilt-up state which is a state of being tilted up more than the first tilt-up state are employed as the tilt-up states of the movable panel 12. In contrast, a posture of the initial tilt-up state taken when the movable panel 12 is transferred from the fully-closed state and a posture of the tilt-up state taken when the movable panel 12 performs the sliding motion may be the same.

In the embodiment described above, a linked mode of the drive shoe 21 and the supporting bracket 31 (the movable panel 12) is only an example. For example, a configuration in which a guide groove directed in the direction opposite to the direction of the guide groove 30 is formed on the supporting bracket 31 (the vertical wall portion 32), and an elevating guide pin fitted into the guide groove so as to be movable is secured to the drive shoe 21 is also applicable.

In the embodiment described above, the holding groove 61 and the holding pin 62 are arranged on the drive shoe 21 and the supporting bracket 31. However, the relationship of arrangement may be vice versa.

In the embodiment described above, the check block 19 may be provided integrally with the guide rail 14.

In the embodiment described above, the fixed cam 51 and the rotating cam 48 are disposed on the drive shoe 21 and the supporting bracket 31 (an edge portion of the movable panel 12 in the vehicle width direction). However, the relationship of arrangement may be vice versa.

Subsequently, the technical idea understood from the embodiment and other examples described above will be added below.

(i) In the vehicle sun roof apparatus according to a third or fourth aspect, the check mechanism includes:

a second sliding member provided so as to be movable along the guide rail and coupled to an edge portion of the movable panel in the vehicle width direction so that the transfer of the movable panel to the tilt-up state is allowed when the sliding member moves forward of the vehicle in the fully-closed state, and the second cam teeth are coupled to the second sliding member so as to be rotatable about the second axial line. In this configuration, the second cam teeth is rotatably coupled to the second sliding member of the check mechanism, so that the second cam teeth (the second member) may be intensively arranged on the check mechanism and hence an apparatus reduced in size as a whole is achieved. Specifically, by applying this configuration to the configuration described in the second aspect of the embodiment, an advantageous effect that the apparatus is further reduced in size as a whole is also achieved. In this case, it is further effective when the rotation check and the second cam teeth (the axial line and the second axial line) are arranged coaxially.

Further, aspects of this disclosure are respectively described below.

According to a first aspect of this disclosure, there is provided a vehicle sun roof apparatus including: a movable panel configured to open and close an opening section formed in a roof portion of a vehicle; a guide rail provided at an edge portion of the opening section in the vehicle width direction and extending in the fore-and-aft direction of the vehicle; a sliding member linked to an edge portion of the movable panel in the vehicle width direction, provided along the guide rail so as to be movable in the fore-and-aft direction of the vehicle, and driven to be moved by an electric drive source; a check mechanism configured to release a movement lock of the movable panel by locking the movement of the movable panel and transferring the movable panel to a tilt-up state by moving a rear portion upward about a supporting point at a front portion when the sliding member moves forward of the vehicle in a fully-closed state of the movable panel, and holding the tilt-up state when the sliding member moves further forward of the vehicle and then moves rearward of the vehicle in the tilt-up state; and an engagement and disengagement switching mechanism provided with a first member supported by either the sliding member or the edge portion of the movable panel in the vehicle width direction, and a second member supported by the other one of the sliding member and the edge portion of the movable panel in the vehicle width direction, and configured to engage the first member and the second member by pressing either one of the first member and the second member by the other one of the first member and the second member by the movement of the sliding member further forward of the vehicle in the tilt-up state so that the movable panel moves integrally when the sliding member moves rearward of the vehicle thereafter.

In this configuration, when the sliding member moves further forward of the vehicle and then moves rearward of the vehicle in the tilt-up state, the tilt-up state is maintained and the movement lock of the movable panel is released by the check mechanism. In contrast, either the first member or the second member of the engagement and disengagement switching mechanism presses the other one of the first member and the second member, whereby the first member and the second member are engaged so that the movable panel moves integrally when the sliding member moves rearward of the vehicle thereafter. Therefore, the movable panel moves rearward of the vehicle integrally with the sliding member, and hence is opened while being maintained in the tilt-up state. In this case, the maximum amount of movement of the sliding member or the like which defines the fully-opened state of the movable panel is not limited by the amount of movement of the sliding member in the direction opposite from the direction of the movable panel when being brought into the tilt-up state (forward of the vehicle). Therefore, the maximum amount of movement of the sliding member or the like which defines the fully-opened state of the movable panel, that is, the amount of opening of the movable panel may be increased.

According to a second aspect of this disclosure, in the vehicle sun roof apparatus, the check mechanism includes a rotation check so as to be rotatable, which is a position of the movement lock of the movable panel when transferring the movable panel from the fully-closed state to the tilt-up state; and the rotation check having an engaging groove or an engaging projection, which is connect with the edge portion of the movable panel in the vehicle width direction, and transferring to release the movement lock of the movable panel by a rotation of the rotational check by one of the engaging groove and the engaging projection presses the other one of the engaging groove and the engaging projection.

In this configuration, the movement lock-and-unlock of the movable panel by the check mechanism and the engagement between the first member and the second member of the engagement and disengagement switching mechanism may be realized in conjunction with the movement of the sliding member in the fore-and-aft direction of the vehicle along the direction of movement of the sliding member. Therefore, an apparatus reduced in size as a whole is achieved.

According to a third aspect of this disclosure, in the vehicle sun roof apparatus, the check mechanism includes:

a check block including an engaging groove and provided on the guide rail; and a rotation check having an engaging projection capable of being locked into the engaging groove and coupled to the edge portion of the movable panel in the vehicle width direction so as to be rotatable about an axial line extending in the fore-and-aft direction of the vehicle, configured to be locked so as not to rotate in a state in which the engaging projection is locked into the engaging groove in the fully-closed state to lock the movement of the movable panel when the sliding member moves forward of the vehicle, be guided to rotate about the axial line when the sliding member further moves forward of the vehicle in the tilt-up state and to disengage the engaging projection from the engaging groove when the sliding member moves rearward of the vehicle thereafter to disengage the movement lock of the movable panel.

In this configuration, the movement lock-and-unlock of the movable panel by the check mechanism is switched by engagement and disengagement between the engaging projection and the engaging groove in association with the rotation of the rotation check about the axial line extending in the fore-and-aft direction of the vehicle. In contrast, the engagement between the first member and the second member of the engagement and disengagement switching mechanism is realized by the movement of the sliding member further forward of the vehicle in the tilt-up state, that is, by the movement along the axial line. Therefore, the movement lock-and-unlock of the movable panel by the check mechanism and the engagement between the first member and the second member of the engagement and disengagement switching mechanism may be realized in conjunction with the movement of the sliding member in the fore-and-aft direction of the vehicle along the direction of movement of the sliding member. Therefore, for example, by coupling the rotation check to the second member and intensively arranging the second member and the rotation check, an apparatus reduced in size as a whole is achieved.

According to a fourth aspect of this disclosure, in the vehicle sun roof apparatus, the first member includes: a first fixed-side member having a plurality of first cam teeth disposed about a second axial line extending in the fore-and-aft direction of the vehicle at every predetermined angle and projecting and being depressed in the direction of the second axial line; and a second fixed-side member arranged on the second member side of the first fixed-side member and including an opened portion configured to open a path to the first cam teeth at every predetermined angle about the second axial line and a locking portion configured to close the path to the first cam teeth; and the second member is coupled so as to be rotatable about the second axial line, and includes second cam teeth passing through the opening section when the sliding member moves further forward of the vehicle in the tilt-up state and being pressed by the first cam teeth, and being pressed by the engaging portion when the sliding member moves rearward of the vehicle thereafter so as to rotate the predetermined angle and engage the engaging portion.

In this configuration, the second cam teeth pass through the opened portion when the sliding member moves further forward of the vehicle in the tilt-up state and are pressed by the first cam teeth, and are pressed by the engaging portion when the sliding member moves rearward of the vehicle thereafter so as to rotate the predetermined angle and engage the engaging portion. In this manner, by the engagement between the first member and the second member by the locking between the locking portion and the second cam teeth, the movable panel moves integrally with the sliding member moving rearward of the vehicle. Therefore, the engagement and disengagement switching mechanism may cause the first member to engage with the second member in a very simple structure such that the second cam teeth passed through the opened portion is pressed by the first cam teeth and the locking portions in sequence to cause the same to rotate the predetermined angle.

According to a fifth aspect of this disclosure, in the vehicle sun roof apparatus, the check mechanism is configured to maintain the tilt-up state in a state in which the movement lock of the movable panel is released until the initial restored state in which the movable panel is transferred from the fully-closed state to the tilt-up state when the sliding member moves forward of the vehicle in a state in which the movable panel is opened, includes a restricting portion configured to restrict pressing of the second cam teeth by the first cam teeth until the restored state is achieved when the sliding member moves forward of the vehicle in the state in which the movable panel is opened, and the second cam teeth rotates by the predetermined angle and passes through the opened portion by being pressed by the first cam teeth when the sliding member moves further forward of the vehicle in the restored state and guided to the opened portion when the sliding member moves rearward of the vehicle thereafter.

In this configuration, when the sliding member moves forward of the vehicle in a state in which the movable panel is opened, the check mechanism maintains the tilt-up state in a state in which the movement lock of the movable panel is released until the restored state is achieved. Therefore, the movable panel moves forward of the vehicle integrally with the sliding member, and hence is closed while being maintained in the tilt-up state. In this case, the pressing of the second cam teeth by the first cam teeth is restricted by the restricting portion, and hence the motion of the engagement and disengagement switching mechanism may be avoided from becoming unstable due to the rotation of the second cam teeth, for example.

Subsequently, when the movable panel becomes the restored state, the movement of the movable panel is locked, and maintenance in the second tilt-up state is released by the check mechanism. The second cam teeth rotate by the predetermined angle and pass through the opened portion by being pressed by the first cam teeth when the sliding member moves further forward of the vehicle in the restored state and guided to the opened portion when the sliding member moves rearward of the vehicle thereafter. In this manner, by the disengagement between the first member from the second member, the sliding member moves rearward of the vehicle while leaving the movable panel. Therefore, the engagement and disengagement switching mechanism may disengage the first member from the second member in a very simple structure such that the second cam teeth are pressed by the first cam teeth, guided by the opened portion, and rotated by the predetermined angle.

Then, the rear portion of the movable panel moves downward about a supporting point at the front portion thereof and becomes the fully-closed state in association with the movement of the sliding member rearward of the vehicle. In this case, since a sufficient amount of movement of the sliding movement when moving the movable panel from the tilt-up state to the fully-closed state may be secured, the load per unit amount of movement of the sliding member may be reduced, and hence the increase in size of the electric power source may be avoided.

According to the aspects of this disclosure, a vehicle sun roof apparatus capable of further increasing the amount of opening of a movable panel configured to perform an opening operation in a tilt-up state may be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle sun roof apparatus comprising:
   a movable panel configured to open and close an opening section formed in a roof portion of a vehicle;
   a guide rail provided at an edge portion of the opening section in the vehicle width direction and extending in the fore-and-aft direction of the vehicle;
   a sliding member linked to an edge portion of the movable panel in the vehicle width direction, provided along the guide rail so as to be movable in the fore-and-aft direction of the vehicle, and driven to be moved by an electric drive source;
   a check mechanism configured to release a movement lock of the movable panel and transferring the movable panel to a tilt-up state by moving a rear portion upward about a supporting point at a front portion of the movable panel when the sliding member moves forward of the vehicle in a fully-closed state of the movable panel, and maintaining the tilt-up state when the sliding member moves further forward of the vehicle and then moves rearward of the vehicle in the tilt-up state; and
   an engagement and disengagement switching mechanism provided with a first member and a second member, and configured to engage the first member and the second member by pressing so that the movable panel moves when the sliding member moves rearward of the vehicle thereafter;
   wherein the check mechanism includes:
   a check block including an engaging groove and being provided on the guide rail; and
   a rotation check having an engaging projection capable of being locked into the engaging groove and being coupled to the edge portion of the movable panel in the vehicle width direction so as to be rotatable about an axial line extending in the fore-and-aft direction of the vehicle, configured to be locked so as not to rotate in a state in which the engaging projection is locked into the engaging groove in the fully-closed state to lock the movement of the movable panel when the sliding member moves forward of the vehicle, be guided to rotate about the axial line when the sliding member further moves forward of the vehicle in the tilt-up state and to release the engaging projection from the engaging groove when the sliding member moves rearward of the vehicle thereafter to disengage the movement lock of the movable panel.

2. The vehicle sun roof apparatus according to claim 1, wherein
   the first member includes:
   a first fixed-side member having a plurality of first cam teeth disposed about a second axial line extending in the fore-and-aft direction of the vehicle at every predetermined angle and projecting and being depressed in the direction of the second axial line; and
   a second fixed-side member arranged on the second member side of the first fixed-side member and including an opened portion configured to open a path to the first cam teeth at every predetermined angle about the second axial line and a locking portion configured to close the path to the first cam teeth; and
   the second member is coupled so as to be rotatable about the second axial line, and includes second cam teeth passing through the opened portion when the sliding member moves further forward of the vehicle in the tilt-up state and being pressed by the first cam teeth, and being pressed by the engaging portion when the sliding member moves rearward of the vehicle thereafter so as to rotate the predetermined angle and engage the engaging portion.

3. The vehicle sun roof apparatus according to claim 2, wherein
   the check mechanism is configured to maintain the tilt-up state in a state in which the movement lock of the movable panel is released until an initial restored state in which the movable panel is transferred from the fully-closed state to the tilt-up state is achieved when the sliding member moves forward of the vehicle in a state in which the movable panel is opened,
   includes a restricting portion configured to restrict pressing of the second cam teeth by the first cam teeth until the restored state is achieved when the sliding member moves forward of the vehicle in the state in which the movable panel is opened, and the second cam teeth rotates by the predetermined angle and passes through the opened portion by being pressed by the first cam teeth when the sliding member moves further forward of the vehicle in the restored state and guided to the opened portion when the sliding member moves rearward of the vehicle thereafter.

4. A vehicle sun roof apparatus comprising:

a movable panel configured to open and close an opening section formed in a roof portion of a vehicle;

a guide rail provided at an edge portion of the opening section in the vehicle width direction and extending in the fore-and-aft direction of the vehicle;

a sliding member linked to an edge portion of the movable panel in the vehicle width direction, provided along the guide rail so as to be movable in the fore-and-aft direction of the vehicle, and driven to be moved by an electric drive source;

a check mechanism configured to release a movement lock of the movable panel and transferring the movable panel to a tilt-up state by moving a rear portion upward about a supporting point at a front portion of the movable panel when the sliding member moves forward of the vehicle in a fully-closed state of the movable panel, and maintaining the tilt-up state when the sliding member moves further forward of the vehicle and then moves rearward of the vehicle in the tilt-up state; and an engagement and disengagement switching mechanism provided with a first member and a second member, and configured to engage the first member and the second member by pressing so that the movable panel moves when the sliding member moves rearward of the vehicle thereafter;

wherein the check mechanism includes a second sliding member provided so as to be movable along the guide rail and coupled to the edge portion of the movable panel in the vehicle width direction so that the transfer of the movable panel to the tilt-up state is allowed when the sliding member moves forward of the vehicle in the fully-closed state, and the second member is coupled to the second sliding member so as to be rotatable about an axial line extending in the fore-and-aft direction of the vehicle for switching of the engagement and disengagement switching mechanism.

* * * * *